July 24, 1962 R. LEVINSOHN 3,045,376
DECORATIVE BOWS AND METHODS OF MAKING THE SAME
Filed April 5, 1962 4 Sheets-Sheet 1
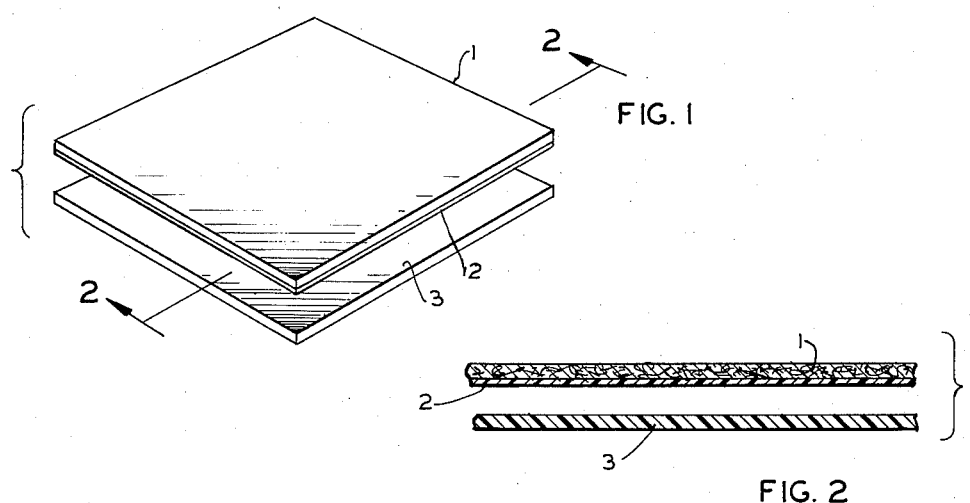
FIG. 1
FIG. 2
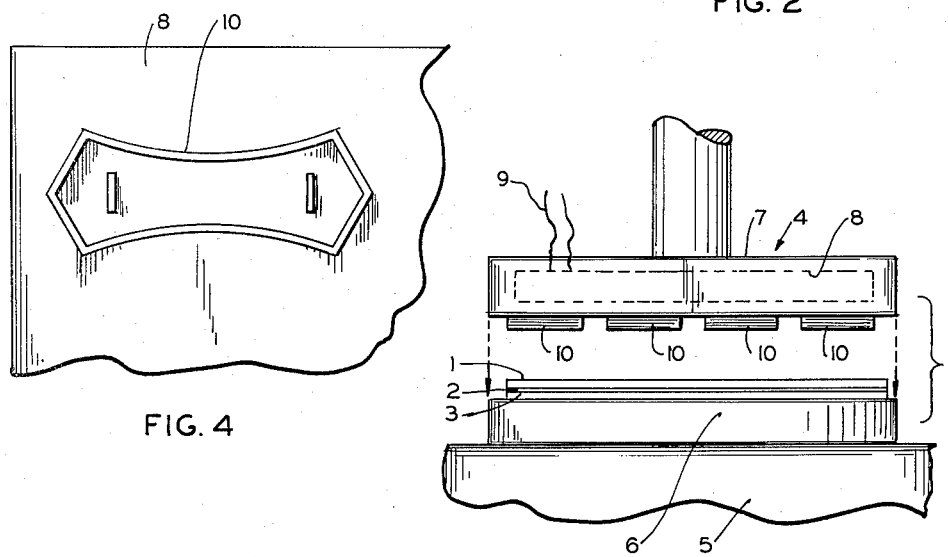
FIG. 4
FIG. 3
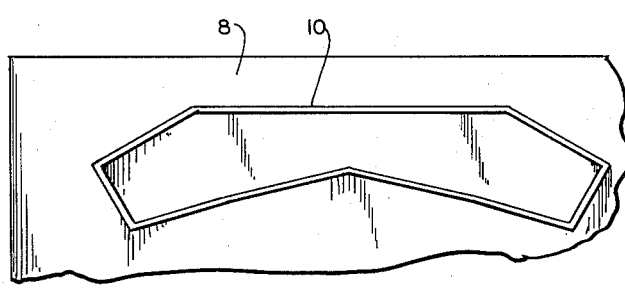
FIG. 5
INVENTOR.
ROBERT LEVINSOHN
BY Alfred W. Petchaft
ATTORNEY July 24, 1962  R. LEVINSOHN  3,045,376
DECORATIVE BOWS AND METHODS OF MAKING THE SAME
Filed April 5, 1962  4 Sheets-Sheet 2

INVENTOR.
ROBERT LEVINSOHN
BY Alfred W. Petchaft
ATTORNEY

July 24, 1962 R. LEVINSOHN 3,045,376
DECORATIVE BOWS AND METHODS OF MAKING THE SAME
Filed April 5, 1962 4 Sheets-Sheet 3

INVENTOR.
ROBERT LEVINSOHN
BY
ATTORNEY

July 24, 1962 R. LEVINSOHN 3,045,376
DECORATIVE BOWS AND METHODS OF MAKING THE SAME
Filed April 5, 1962 4 Sheets-Sheet 4

INVENTOR.
ROBERT LEVINSOHN
BY
ATTORNEY

United States Patent Office 3,045,376
Patented July 24, 1962

3,045,376
DECORATIVE BOWS AND METHODS OF
MAKING THE SAME
Robert Levinsohn, 11 Bon Hills, Olivette, Mo.
Filed Apr. 5, 1962, Ser. No. 183,842
12 Claims. (Cl. 41—10)

This invention relates in general to leather bows and, more particularly, to decorative bows and methods for making the same on women's shoes, and is a continuation-in-part of my copending application Serial No. 138,028, filed September 14, 1961, now abandoned.

Leather and fabric bows or similar decorative ornaments are frequently used on ladies' and children's shoes, as well as on other articles of wearing apparel. The bow or similar decorative ornament is normally constructed of the same leather or fabric as the upper of the shoe to which the bow is applied.

In the manufacture of inexpensive ladies' shoes, the construction of these bows and similar decorative items, present a serious and costly problem to the manufacturer. Heretofore, it has been the custom to cut the necessary patterns from a piece of leather or fabric and then manually construct the bow. The leather or fabric required and the amount of time consumed in making such bows considerably increase the cost thereof and consequently genuine leather bows are used only on higher priced shoes. Other attempts have been made to produce an inexpensive bow for ladies' shoes from plastic or other synthetic materials. However, such bows have an unreal appearance and are less attractive to the purchaser.

It is, therefore, the primary object of the present invention to produce inexpensive, but nevertheless, attractive leather bows and other decorative ornaments of the type used on women's and children's shoes.

It is another object of the present invention to provide a bow of the type stated that is sturdy in construction and economical to manufacture.

It is also an object of the present invention to provide a bow which has the appearance and attractiveness of a genuine leather bow but is constructed partially of leather and partially of synthetic materials in a manner which substantially reduces the material and labor costs thereof.

It is a further object of the present invention to provide a method for making shoe bows at a relatively high rate of speed and with a minimum of manual labor and materials so that the manufacturing costs are reduced to a minimum.

With the above and other objects in view, my invention resides in the novel features of form, construction, arrangement, and combination of parts presently described and pointed out in the claims.

In the accompanying drawings (four sheets)—

FIG. 1 is a perspective view of a sheet of vinyl material and a sheet of leather or fabric used in making bows in accordance with and embodying the present invention;

FIG. 2 is a transverse sectional view of the vinyl and leather or fabric sheets in superposed relationship;

FIG. 3 is a side elevational view of a clicker die assembly used in connection wth the present invention;

FIGS. 4 and 5 are fragmentary plan views of two different dies used in producing the bows of the present invention;

Figure 6:
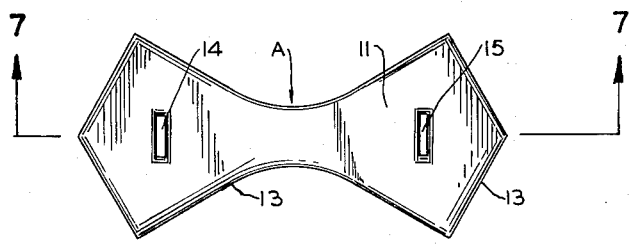
FIG. 6 is a plan view of one type of bow constructed in accordance with and embodying the present invention.

Referring now in more detail and by reference characters to the drawings, which illustrate practical embodiments of the present invention, 1 designates a sheet of leather, fabric, or similar bow-making material, which is coated completely on its underside with a thin film 2 formed of an acrylic emulsion which will dry to a substantially non-tacky surface and is capable, under heat and pressure, of bonding to a material such as leather or fabric and to synthetic resin sheets, such as vinyl sheeting. One form of such emulsion which has been found to be operative in the present invention is an aqueous emulsion containing approximately fifty percent by weight of a cross polymer formed from equal molecular weights of ethyl acrylate and ethyl ethacrylate. It should be understood, however, theat various coating materials may be used provided that the coating material selected will dry to a non-tacky surface, will adhere to leather, and, under heat and pressure, will form a strong bond between leather and a synthetic resin sheet.

The film 2 is allowed to dry and then the sheet 1 is laid in facewise superposition on a sheet of vinyl plastic 3 so that one face of the latter is in contact with the film 2. Since the film 2 is non-tacky, there will be no appreciable degree of adherence.

The sheet 1 and the sheet 3, in the aforesaid superposed relation, are placed in a high frequency heat-sealing machine 4 having an electrically conductive bed-plate 5 which supports a lower die 6. Operatively mounted above the die 6 is an upper electrically conductive die 7 having one or more die-elements 8 which is conventionally connected to some convenient source of high frequency voltage by means of electric cables 9. The upper die 7 is provided with a plurality of downwardly extending punches 10 having the necessary contour to punch out a bow of the desired peripheral shape.

With the sheets 1, 3, in position on the lower die 6, the heated upper die 7 is brought down and caused to punch through such superposed sheets 1, 3, thereby punching out a plurality of bows corresponding to the number of punches 10 and at the same time bonding the leather and vinyl plastic sheeting together in a thin perimetral line.

Figure 7:
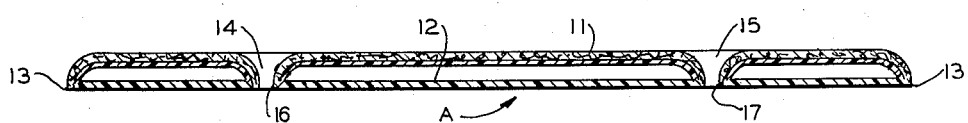
FIG. 7 is a longitudinal sectional view taken along line 7—7 of FIG. 6.

If, for example, it is desired to make a flat bow of the type shown in FIG. 7, a die of the type shown in FIG. 4 may be employed, in which case, with each stroke of the machine 4, a plurality of bows A will be formed. Such bow A comprises an outer or externally presented ply 11 formed of leather or fabric and an under-ply 12 formed of vinyl sheeting. The plies 11, 12, are perimetrally bonded around the sealing line 13 and are provided interiorly with two slots 14, 15, which are defined by annular sealing lines 16, 17, respectively, and are adapted to receive some suitable form of fastening element by which the bow A may be secured to a shoe or other article which it may adorn. Since the fastening element is entirely conventional and not a part of the present invention, it is neither shown nor described herein.

Figure 10:
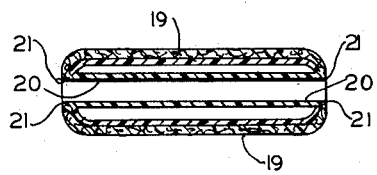
FIG. 10 is a transverse sectional view taken along line 10—10 of FIG. 9.
Figure 8:
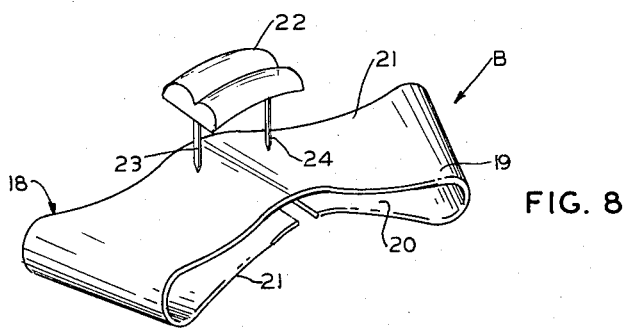
FIG. 8 is an exploded view of another type of bow constructed in accordance with and embodying the present invention.
Figure 9:
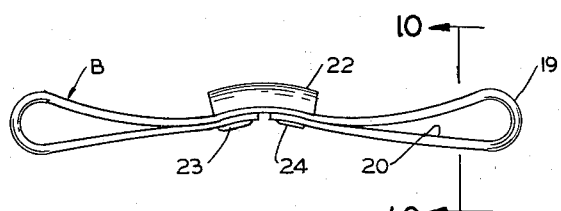
FIG. 9 is an end elevational fully assembled view of the bow shown in FIG. 8.

It is also possible to provide another type of ornamental bow B which may be constructed in accordance with the present invention by using a die of the type shown in FIG. 5, thereby stamping out a bow-forming strip 18 consisting of an outwardly presented top ply 19 of leather or fabric and an under-ply 20 formed of vinyl sheeting, the plies 19, 20, being peripherally bonded by a sealing line 21 in the manner previously described in connection with the bow A. The outer ends of the bow-forming strip 18 are folded back toward the center in the manner shown in FIG. 8 and clamped outwardly by an ornamental staple-like element consisting of a plastic top 22 and metal prongs 23, 24, which are inserted through the bow-forming element 18 and clinched in the manner shown in FIG. 9. If desired, the prongs 23, 24, can be used in the usual and conventional way for clinching the bow to the upper part of a shoe (not shown). As may be seen from FIGS. 7 and 10, the plies of material which form the bows A and B are only bonded along peripheral lines or edges and the interior facewise overlying areas are free. As a matter of fact, during the bending process a slight film of air will ordinarily be enclosed within the interior of each bow which will tend to give the bow a slightly puffed appearance akin to a natural hand-tied bow, thereby materially improving and enhancing the appearance of the product.

Figure 11:
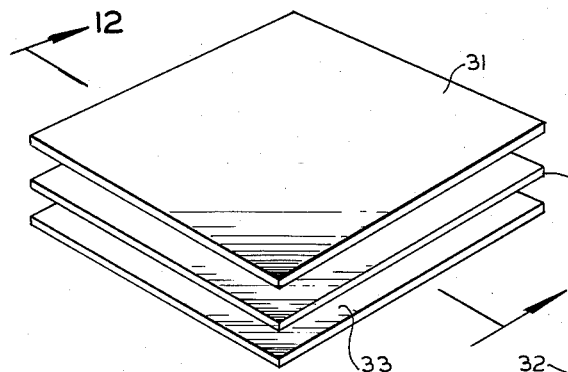
FIG. 11 is a perspective view of superposed sheets of material used in a modified form of method for making bows in accordance with and embodying the present invention.
Figure 12:
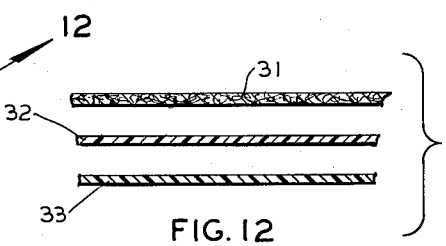
FIG. 12 is a transverse sectional view of the superposed sheets taken along line 12—12 of FIG. 11.
Figure 13:
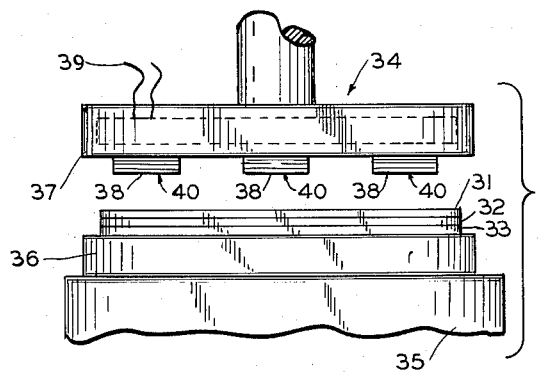
FIG. 13 is a side elevational view of a clicker die assembly as used in carrying out the modified form of method of the present invention.

If desired, it is possible to make bows in accordance with the present invention by a modified form of method as shown in FIGS. 11 to 20, inclusive. As illustrated in FIG. 11, 31 designates a sheet of leather or fabric, 32 is a sheet of vinyl plastic material, and 33 is a thin sheet or film of acrylic resin or other thermoplastic sheeting which is capable, under heat and pressure, of bonding to leather or fabric and to synthetic resin sheets, such as the vinyl sheet 32. Preferably, though not necessarily, the sheets 31, 32, and 33, are of the same perimetral size and shape.

The three sheets 31, 32, 33, are laid in facewise superposition upon each other and, in such superposed relation, are placed in a high frequency heat-sealing machine 34 having an electrically conductive bed-plate 35 which supports a lower die 36. Operatively mounted above the die 36 is an upper electrically conductive die 37 having one or more die-elements 38 which is conventionally connected to some convenient source of high frequency voltage by means of electric cables 39. These die-elements have the desired perimetral contour of the desired bow-forming blank and are wide enough to form a narrow marginal seam or seal. The upper die 37 is also provided with a plurality of downwardly extending punches 40 having the necessary contour to punch out a bow of the desired peripheral shape and mounted snugly around the die-elements 38 in vertically slidable relation thereto. The punches 40 and die-elements 38 are arranged for consecutive operation during a bow-forming cycle.

With the sheets 31, 33, in position on the lower die 36, the heated upper die 37 is brought down in a first or initial stroke to punch through such superposed sheets 31, 32, 33, thereby punching out a plurality of bow-forming blanks corresponding to the number of punches 40. Then the upper die 37 is shifted further in a downward direction toward the lower die 36 so that the die-element 38 will come in contact with the die-cut bow-forming blanks, thereby bonding the vinyl leather, acrylic and vinyl pieces together in a thin perimetral line.

Figure 14:
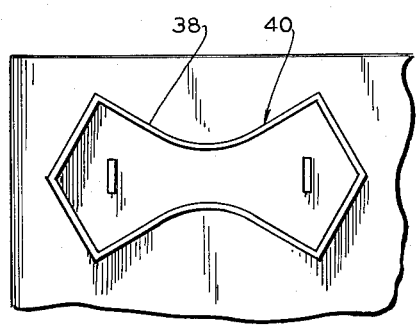
FIG. 14 is a fragmentary bottom plan view of a die used in producing a bow in accordance with the modified form of method of the present invention.
Figure 15:
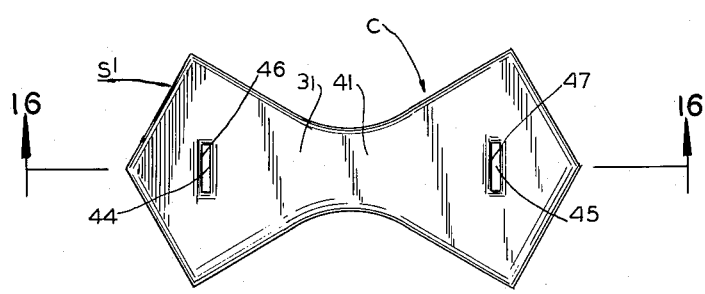
FIG. 15 is a plan view of a modified form of bow constructed in accordance with and embodying the present invention.

If, for example, it is desired to make a flat bow of the type shown in FIG. 15, a die of the type shown in FIG. 14 may be employed, in which case, with each stroke of the machine 34, a plurality of bows C will be formed which are substantially similar to the previously described bows A. Such bow C comprises an outer or externally presented ply 41 formed of leather or fabric, an under-ply 42 formed of vinyl sheeting and an intermediate ply of acrylic sheeting 43. The plies 41, 42, are perimetrally bonded around the sealing line $s^1$ and are provided interiorly with two slots 44, 45, which are defined by annular sealing lines 46, 47, respectively, and are adapted to receive some suitable form of fastening element by which the bow C may be secured to a shoe or other article which it may adorn. Since the fastening element is entirely conventional and not a part of the present invention, it is neither shown nor described herein.

It is also possible to provide another type of ornamental bow D which may be constructed in accordance with the present invention by stamping out a bow-forming blank 48 consisting of an outwardly presented top ply of leather 49, an under-ply 50 formed of vinyl sheeting, and an intermediate ply of acrylic sheeting 51, the plies 49, 50, being peripherally bonded by a sealing line $s^2$ in the manner previously described in connection with the bow C. The outer ends of the bow-forming strip 48 are folded back toward the center in the manner shown in FIG. 19 and clamped outwardly by an ornamental staple-like element consisting of a plastic top 52 and metal prongs 53, 54, which are inserted through the bow-forming element 48 and clinched in the manner shown in FIG. 20. If desired, the prongs 53, 54, can be used in the usual and conventional way for clinching the bow to the upper part of a shoe (not shown).

Figure 16:
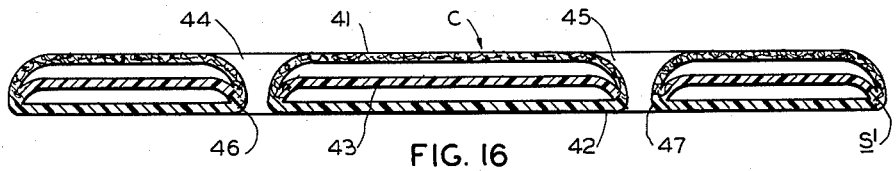
FIG. 16 is a longitudinal sectional view taken along line 16—16 of FIG. 15.
Figure 17:
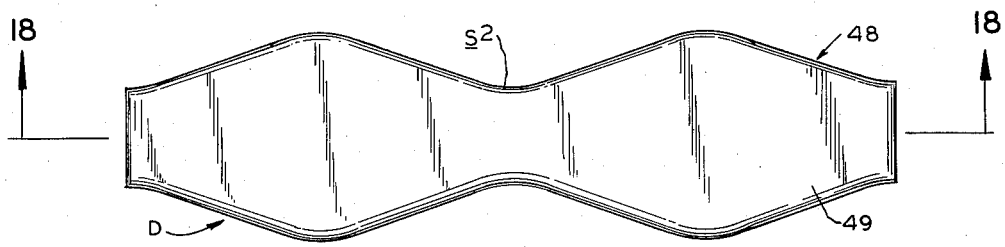
FIG. 17 is a plan-pattern view of another modified form of bow constructed in accordance with and embodying the present invention.
Figure 18:
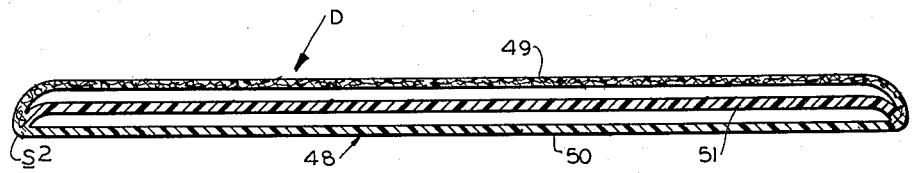
FIG. 18 is a transverse sectional view taken along line 18—18 of FIG. 17.
Figure 19:
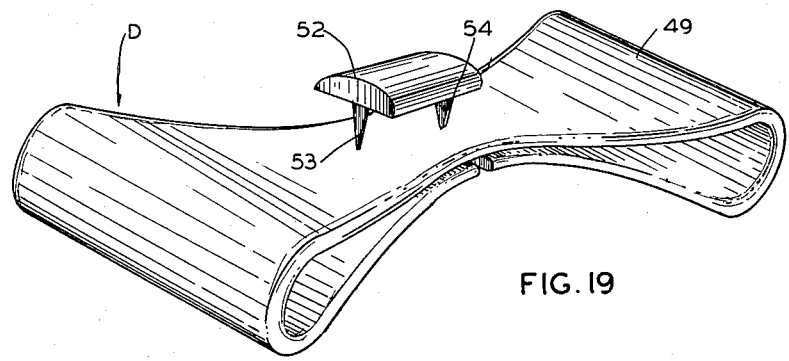
FIG. 19 is a perspective view of the bow shown in plan-pattern form in FIG. 17.
Figure 20:
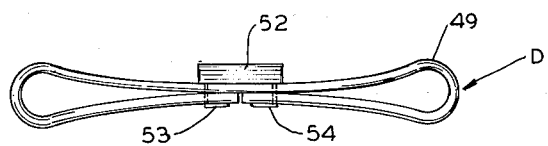
FIG. 20 is an end elevational fully assembled view of the bow shown in FIG. 19.

As may be seen from FIGS. 16 and 18, the plies of material which form the bows C and D are only bonded along peripheral lines or edges and the interior facewise overlying areas are free. As a matter of fact, during the bonding process a slight film of air will ordinarily be enclosed within the interior of each bow which will tend to give the bow a slightly puffed appearance akin to a natural hand-tied bow, thereby materially improving and enhancing the appearance of the product.

It has been found, in connection with the present invention, that it is also possible, by the above-described methods, to manufacture bows from decorative fabrics, such as velvet, faille, satin, and moire, instead of leather. In other words, a piece of fabric may be used in place of the sheet of leather.

It should be understood that changes and modifications in the form, construction, arrangement, and combination of the several parts of the decorative bows and methods of making the same, and in the steps of their production, may be made and substituted for those herein shown and described without departing from the nature and principle of my invention.

Having thus described my invention, what I claim and desire to secure by Letters Patent is—

1. The method of making bows for women's shoes, which method comprises coating a sheet of leather with a film of acrylate emulsion, drying said film, placing said sheet of coated material on a sheet of vinyl material so that said film lies on the upper surface of said vinyl material in facewise engagement, and cut-seaming the superposed sheets by means of a heated die so as to edge-unite said sheets to provide a bow-forming member.

2. The method of making bows for women's shoes according to claim 1 in which the acrylate emulsion is an aqueous emulsion containing approximately fifty percent by weight of a cross polymer formed from equal molecular weights of ethyl acrylate and ethyl ethacrylate.

3. The method of making bows for women's shoes, which method comprises coating a sheet of fabric with a film of acrylate emulsion, drying said film, placing said sheet of coated material on a sheet of vinyl material so that said film lies on the upper surface of said vinyl material in facewise engagement, and cut-seaming the superposed sheets by means of a heated die so as to edge-unite said sheets to provide a bow-forming member.

4. The method of making bows for women's shoes according to claim 4 in which the acrylate emulsion is an aqueous emulsion containing approximately fifty percent by weight of a cross polymer formed from equal molecular weights of ethyl acrylate and ethyl ethacrylate.

5. The method of making bows for women's shoes, which method comprises superimposing a sheet of leather upon a thin sheet of acrylic resin, placing said superposed sheets on a sheet of vinyl material in facewise engagement, and cut-seaming the superposed sheets by means of a heated die so as to edge-unite said sheets to provide a bow-forming member.

6. The method of making bows for women's shoes, which method comprises superimposing a sheet of fabric upon a thin sheet of acrylic resin, placing said superposed sheets on a sheet of vinyl material in facewise engagement, and cut-seaming the superposed sheets by means of a heated die so as to edge-unite said sheets to provide a bow-forming member.

7. An ornamental bow comprising a plural-ply bow-forming member including an upper ply of leather, a lower ply of a vinyl resin sheet, and an intermediate thin film of acrylic resin, said plies being edge-united by a narrow peripheral heat-sealed seam, said plies furthermore being otherwise substantially free of each other and slightly separated by a thin film of entrapped air.

8. An ornamental bow comprising a plural-ply bow-forming member including an upper ply of fabric, a lower ply of a vinyl resin sheet, and an intermediate thin film of acrylic resin, said plies being edge-united by a narrow peripheral heat-sealed seam, said plies furthermore being otherwise substantially free of each other and slightly separated by a thin film of entrapped air.

9. An ornamental bow comprising a two-ply bow-forming member consisting of an upper ply of leather, said upper ply being provided upon its under face with a dry adherent film of acrylic resin emulsion, and a lower ply of vinyl resin sheet, said plies being edge-united by a narrow peripheral heat-sealed seam, said plies furthermore being otherwise substantially free of each other and slightly separated by a thin film of entrapped air.

10. An ornamental bow comprising a two-ply bow-forming member consisting of an upper ply of fabric, said upper ply being provided upon its under face with a dry adherent film of acrylic resin emulsion, and a lower ply of vinyl resin sheet, said plies being edge-united by a narrow peripheral heat-sealed seam, said plies furthermore being otherwise substantially free of each other and slightly separated by a thin film of entrapped air.

11. An ornamental bow comprising a three-ply bow-forming member consisting of an upper ply of leather, a lower ply of a vinyl resin sheet, and an intermediate ply of thin acrylic resin sheet, said plies being edge-united by a narrow peripheral heat-sealed seam, said plies furthermore being otherwise substantially free of each other and slightly separated by a thin film of entrapped air.

12. An ornamental bow comprising a three-ply bow-forming member consisting of an upper ply of fabric, a lower ply of a vinyl resin sheet, and an intermediate ply of thin acrylic resin sheet, said plies being edge-united by a narrow peripheral heat-sealed seam, said plies furthermore being otherwise substantially free of each other and slightly separated by a thin film of entrapped air.

References Cited in the file of this patent

UNITED STATES PATENTS

| | | |
|---|---|---|
| 1,388,762 | Riley | Aug. 23, 1921 |
| 1,625,394 | Roberts | Apr. 19, 1927 |
| 2,062,248 | Heck | Nov. 24, 1936 |
| 2,430,934 | Kemmler et al. | Nov. 18, 1947 |
| 2,549,985 | Normington | Apr. 24, 1951 |
| 2,631,646 | Gannon et al. | Mar. 17, 1953 |
| 2,729,009 | Markus et al. | Jan. 3, 1956 |